United States Patent [19]
Litt

[11] 3,933,584
[45] Jan. 20, 1976

[54] GRID FOR NUCLEAR FUEL ASSEMBLY
[75] Inventor: Kenneth C. Litt, Silver Spring, Md.
[73] Assignee: Nuclear Fuel Services, Inc., Rockville, Md.
[22] Filed: Apr. 23, 1973
[21] Appl. No.: 353,448

[52] U.S. Cl. ................................................. 176/78
[51] Int. Cl. ............................ G21c 3/18; G21c 3/34
[58] Field of Search ........................................ 176/78

[56] References Cited
UNITED STATES PATENTS

| | | | |
|---|---|---|---|
| 3,377,254 | 4/1968 | Frisch ................................... | 176/78 |
| 3,379,617 | 4/1968 | Andrews et al. ...................... | 176/78 |
| 3,746,619 | 7/1973 | Iwao ..................................... | 176/78 |
| 3,809,609 | 5/1974 | Krawice et al. ....................... | 176/78 |

FOREIGN PATENTS OR APPLICATIONS

| | | | |
|---|---|---|---|
| 1,439,362 | 4/1964 | Germany .............................. | 176/78 |

*Primary Examiner*—Verlin R. Pendegrass
*Attorney, Agent, or Firm*—Bacon & Thomas

[57] ABSTRACT

A spacer grid for nuclear fuel rods is formed of generally identical metal straps arranged in crossed relation to define a multiplicity of cells adapted to receive elongated fuel elements or the like. The side walls of each cell have openings for intercell mixing of coolant and tabs from edges of the openings defining helical coolant deflectors in the cells. Tabs from adjacent side walls are fixedly secured together to provide rigidifying flanges for the grid. Spring fingers at the ends of the cells provide for holding fuel rods against fixed stops.

9 Claims, 5 Drawing Figures

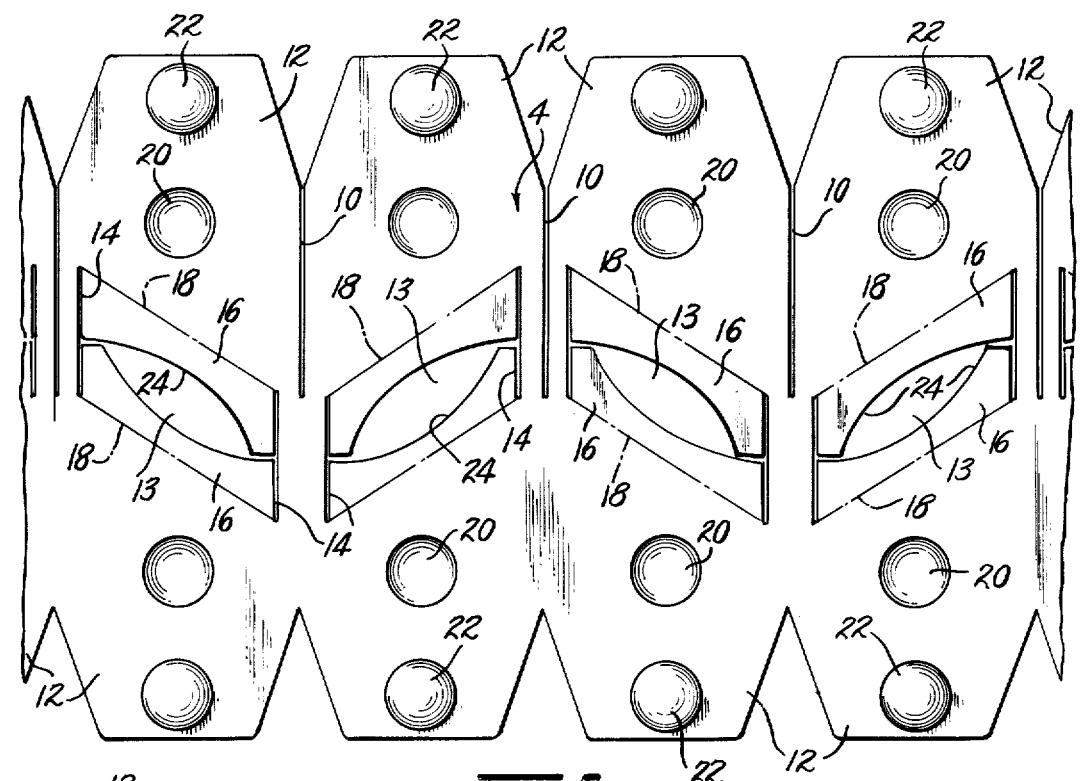
Fig. 3.
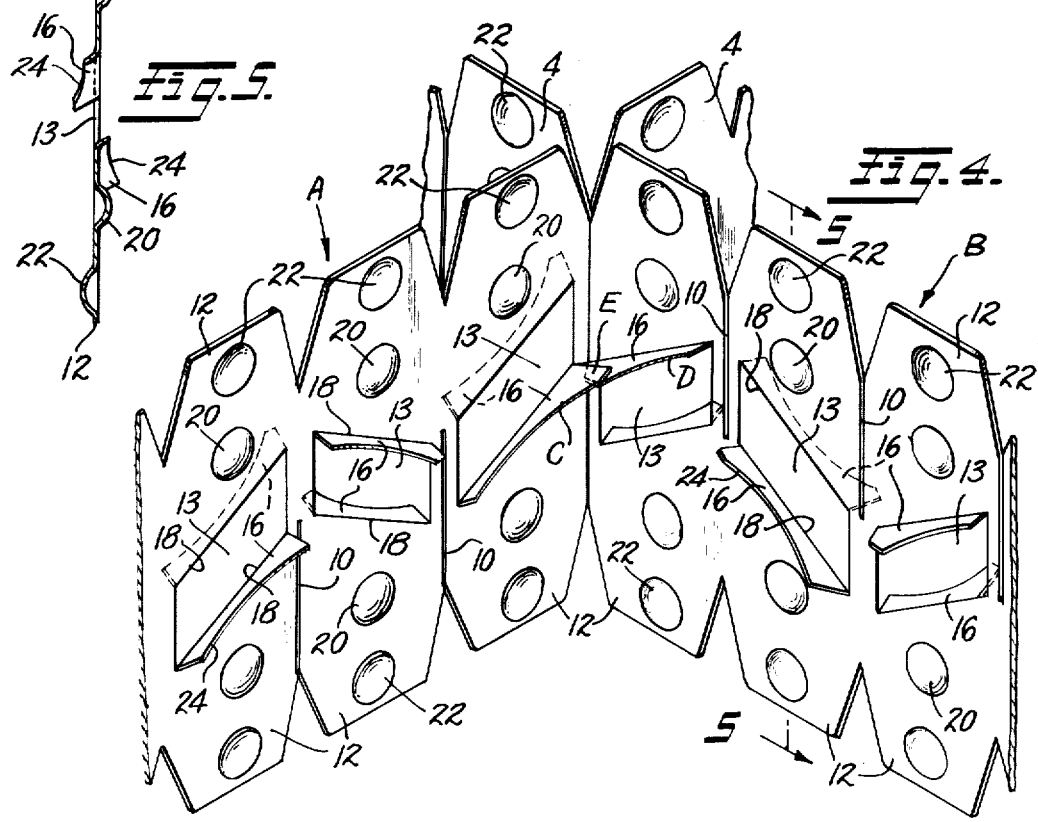
Fig. 5.
Fig. 4.

GRID FOR NUCLEAR FUEL ASSEMBLY

BACKGROUND OF THE INVENTION

This invention is in the field of support grids for spacing and holding nuclear fuel rods in a nuclear fuel assembly.

It is necessary that elongated fuel rods employed in nuclear fuel assemblies be held against undue vibration or lateral movement and that the holding means do not interfere with flow of coolant water along the rods. Many devices have been proposed, including grids formed of strip metal arranged in crossed relationship having fixed stops and spring fingers to engage and hold the fuel rods. Such devices, however, have been formed of relatively heavy gauge metal since rigidity is essential to properly hold the rods in predetermined position. The materials of which the grids are made is expensive and thus the heavy gauge metals employed render the cost of manufacture and maintenance quite high and also unduly absorb neutrons.

It has further been proposed heretofore to incorporate separate vanes adjacent or on the grids to direct coolant flow in an effort to enhance mixing the coolant as it flows through the reactor core.

SUMMARY OF THE INVENTION

The present invention comprises a fuel rod supporting grid formed of thin gauge sheet metal and arranged to define a multiplicity of open-ended cells having side walls of the sheet metal. The side walls of each cell are provided with openings having tabs struck in opposite directions therefrom to extend into the cells and arranged at an oblique angle to induce helical flow of coolant along the fuel rods and to promote intercell mixing of coolant through the openings. The tabs or flanges are arranged so that the ends of adjacent tabs in the cells are overlapped and brazed or otherwise secured together to form laterally extending rigidifying flanges for the grid structure, thus increasing the lateral strength and resistance to distortion. The side walls of the cells further extend axially beyond the open ends of the cells to define cantilevered spring fingers provided with protuberances adjacent their tips and stationary protuberances adjacent their bases to engage and securely hold fuel rods in the cells. The spacer grid design consists of a square egg crate structure with cantilevered springs at the top and bottom of the grid. The grid contact on the fuel rod is designed so that each rod is free to move independently with only minimal axial friction while simultaneously providing sufficient grid contact force to minimize fretting. In addition, the fuel rod scoring, which is normally associated with fuel rod insertion through the grids in the assembly, is significantly reduced. This reduction of scoring leaves a smoother fuel clad surface which is less susceptible to local attack by the various corrosion mechanisms present in the reactor environment. Axial friction forces between spacer grids and control rod guide tubes minimize the possibility of detrimental fuel rod bowing.

BRIEF DESCRIPTION OF THE DRAWINGS

FIG. 3 is a plan view of a blank of sheet metal stamped to the form for constructing the grid;

FIG. 4 is a perspective view of portions of two strips of FIG. 3 arranged in crossed relation to illustrate the manner of assembling the present grid; and FIG. 5 is a sectional view taken along the line 5—5 of FIG. 4.

DESCRIPTION OF A PREFERRED EMBODIMENT

Figures 1, 2:
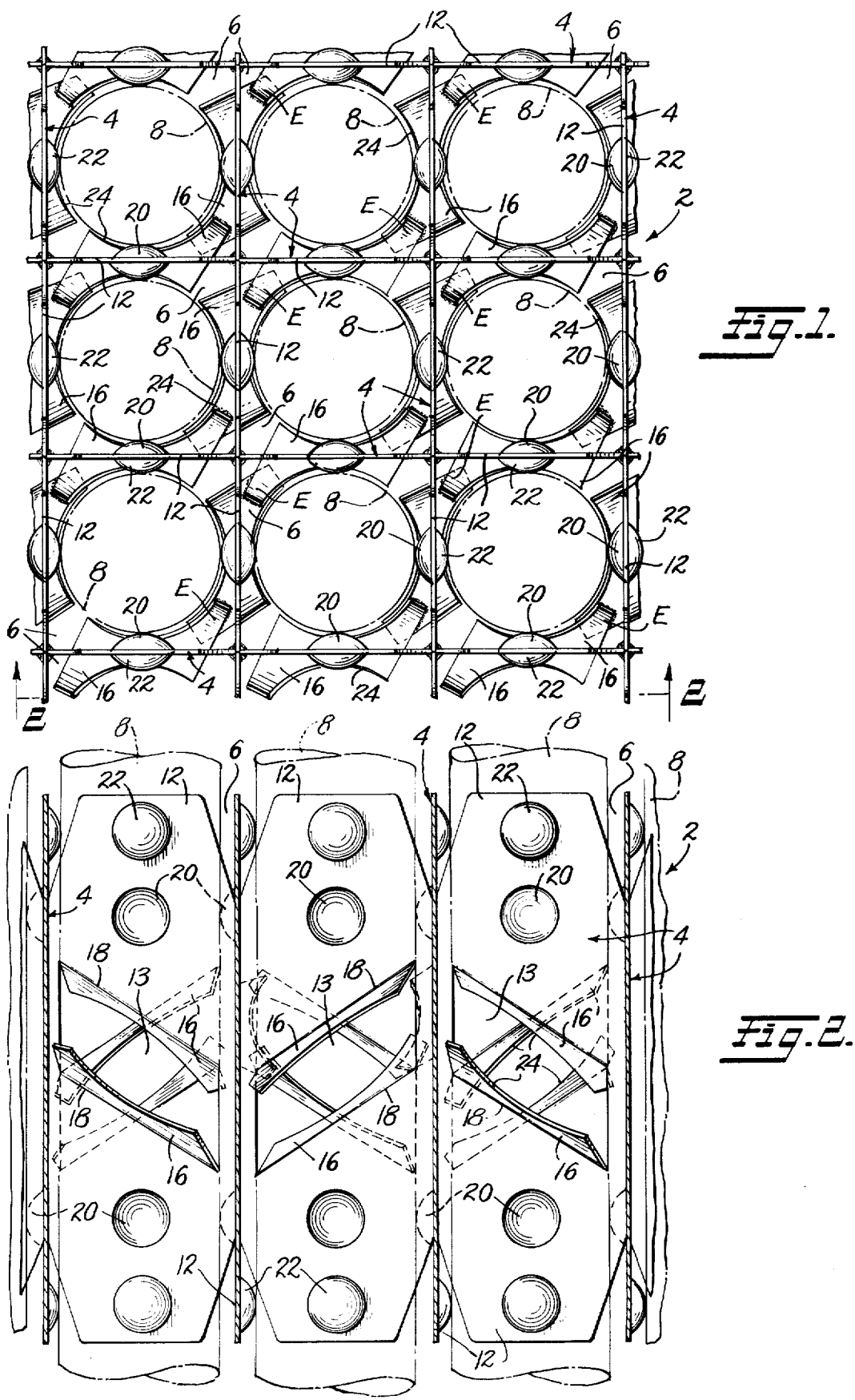
FIG. 1 is a plan view of a portion of a grid embodying the present invention.
FIG. 2 is a side view of that portion of the grid shown in FIG. 1.

As shown in FIGS. 1 and 2, the support grid, generally designated 2, is formed of a plurality of straps 4 of relatively thin sheet metal arranged in crossed relationship to define a multiplicity of generally square open-ended cells 6, through which fuel rods 8 are adapted to extend when the reactor core is assembled. The straps 4 are all generally identical and are best shown in FIGS. 3 and 4. Each strip 4 is provided with a plurality of slits 10 and a series of spring fingers 12 extending along each edge thereof, there being a spring finger between each pair of slits 10. Generally along the longitudinal center line of the strap 4, a series of openings 13 are stamped or otherwise formed in the general shape of an oblique parallelogram with adjacent openings sloping in opposite directions relative to the longitudinal center line of the strap 4. The openings are defined by central cut-out portion 13 and slits 14 defining the ends of tabs 16. The tabs 16 are secured to the strip along fold lines 18 as shown.

Adjacent the base portion of each spring finger 12 a hemispherical dimple or protuberance 20 is formed in the sheet metal and both such dimples between any single pair of slits 10 are struck to extend in the same direction, as clearly evident from FIG. 5. Adjacent the ends of the spring fingers 12 additional hemispherical protuberances or dimples 22 are formed to project from the opposite face of the spring fingers on strap 4, as also clearly shown in FIG. 5. Before assembling the strips of FIG. 3 into a grid structure, the tabs 16 are folded along their fold lines 18 so that one tab from each opening is folded to one side of the strap 4 and the other tab is folded to the other side, this also is shown more clearly in FIG. 5. After the straps 4 have been formed and their tabs folded as described, a grid is assembled as partly shown in FIG. 4.

A strap 4 is placed with its slits 10 extending downwardly, as shown at A in FIG. 4 and a second similar strap 4 is arranged with its slits 10 extending upwardly as shown at B in FIG. 4. The straps are arranged in crossed relationship so that their slits mutually engage to permit the crossed relationship shown in FIG. 4, as is more or less conventional and sometimes referred to as "egg crate" construction. A selected slit 10 on the strip at B is engaged with a selected slit 10 of the strip at A so that adjacent tabs, as shown at C and D, respectively, lie in substantially the same plane oblique to the directions of the slits 10. The tabs 16 are so formed that the adjacent ends of tabs C and D are in overlapping contact with each other when the strips are arranged as shown. It is to be noted that tab C is folded from the bottom edge of its opening 13 whereas tab B is folded from the upper edge of its opening 13, and the tabs from the opposite edges of those openings extend to the opposite sides of their respective straps 4. After the pair of straps shown in FIG. 4 are assembled in the manner described, additional straps are engaged with the straps at A and B in the same manner until the grid is complete. As stated previously, each of the straps 4 is generally identical to all others; however, certain of the straps will have slightly different constructions to properly define the outer boundaries of the grid, all as will be obvious to those skilled in the art.

Either during assembly or after all of the straps have been assembled as described, the engaging and crossing portions of the straps 4 and the overlapped portions E of the tabs 16 are secured together, preferably by brazing or the like, to permanently secure the grid members in fixed relation and to secure the overlapped tabs 16 to define essentially a single helical baffle and rigidifying flange structure.

As shown, the free edges of the tabs 16 are curved, as at 24, so that the inner edges of all of the tabs extending into any one cell 6 define a generally cylindrical passageway for the loose reception of a fuel rod 8 with clearance between the tabs and fuel rods. This feature is clearly evident from FIG. 1 of the drawings.

Each of the spring fingers 12 is preferably bent slightly (not shown) in the direction in which the dimples 22 extend so that those tabs extend slightly obliquely into the end portions of the cells which receive the fuel rods 8. Thus, when the fuel rods are inserted into the cells in the manner indicated in FIG. 2, they will engage a pair of axially spaced fixed stops 20 on one wall of the cell and will be engaged and pressed toward the stops 20 by spring fingers 12 and movable stops 22 on the opposite wall of that cell. Thus, each fuel rod engages four hard stops and is engaged by four resiliently movable stops in each cell with the points of engagement being symmetrically arranged axially of the fuel rods to minimize bending thereof. The arrangement serves to locate the fuel rods in the centers of the cells.

The parts are so proportioned that the spring fingers 12 which are initially bent inwardly are resiliently flexed to lie substantially coplanar with their supporting cell wall when the fuel rods are in position.

It is to be noted from FIG. 1 that there are two overlapped portions E in each cell, in diagonally opposite corners thereof, thus forming an extremely rigid grid structure.

The construction described herein permits forming the grid of much thinner material than was heretofore possible and provides greater strength and rigidity while materially reducing the quantity and cost of metal employed. Further, since the metal of the straps is thinner than heretofore, an improvement in neutron economy is realized.

During operation of the reactor having the grid of the present invention therein, coolant water is caused to flow axially along the fuel rods 8 and it will be obvious that the oblique vanes 16 define helical guide vanes to cause the coolant to swirl around the fuel rods while the openings 12 permit and induce intercell mixing of the coolant through those openings to thus enhance more uniform temperature conditions throughout the reactor core.

While a single specific embodiment of the invention has been shown and described herein, the same is merely exemplary of the principles involved and other forms may be resorted to within the scope of the appended claims.

I claim:

1. A grid structure for a nuclear reactor fuel assembly comprising a plurality of members arranged to define the side walls of a plurality of adjacent open-ended grid cells through which elongated elements are adapted to extend;

each of said side walls having an opening therethrough and extending across a major portion of the width thereof and communicating with an adjacent cell; and substantially planar tabs of a length equal to a major portion of the width of said walls extending from edges of said openings into adjacent cells and extending oblique to the axes of said cells whereby to cause helical flow of a coolant flowing through said cells and intercell coolant mixing through said openings.

2. A grid structure as defined in claim 1 wherein the inner edges of said tabs are curved to define a generally cylindrical channel through said cells for receiving said elongated elements.

3. A grid structure as defined in claim 1 wherein tabs from adjacent side walls extend into the same cell, are arranged to lie in substantially the same oblique plane, and have adjacent end portions in mutual engagement and fixedly secured together to define a generally helical coolant deflector and to further serve as rigidifying flanges for said grid structure.

4. A grid structure as defined in claim 3 wherein said adjacent end portions are in overlapping relation.

5. A grid structure as defined in claim 3 wherein each of said cells is generally square, having four side walls, with a tab extending thereinto from each side wall, there being said fixedly secured end portions at diagonally opposite corners of each of said cells.

6. A grid structure as defined in claim 1 wherein said members comprise a plurality of substantially identical straps arranged in interlocked crossing relation; each strap having a series of said openings and tabs formed thereon with a pair of said tabs extending from each opening, from opposite edges thereof, and extending to opposite sides of said strip; said opposite edges and tabs being oblique to the length of said strip, the said edges and tabs of adjacent openings extending in opposite oblique directions.

7. A grid structure as defined in claim 1 including integral resilient fingers extending axially from each end of each side wall of said cells; a rigid protuberance extending into each cell from adjacent the base of each resilient finger on at least one side wall, and a resiliently movable protuberance formed adjacent the end of each spring finger on an opposed wall and extending inwardly of said cell.

8. A grid structure as defined in claim 7 wherein each of said spring fingers is bent to normally extend obliquely inwardly of that cell toward which its resiliently movable protuberance extends.

9. A grid structure as defined in claim 7 wherein each of said spring fingers is provided with one of said rigid protuberances extending in one direction and one of said resiliently movable protuberances facing the opposite direction.

* * * * *